United States Patent [19]

King

[11] 4,424,130

[45] Jan. 3, 1984

[54] RAKE DRIVE AND LIFTING DEVICE FOR SEDIMENTATION APPARATUS

[75] Inventor: Donald L. King, Bountiful, Utah

[73] Assignee: Envirotech Corporation, Salt Lake City, Utah

[21] Appl. No.: 414,149

[22] Filed: Sep. 2, 1982

[51] Int. Cl.³ .............................................. B01D 21/06
[52] U.S. Cl. ..................................................... 210/531
[58] Field of Search ................................. 210/528–531

[56] References Cited

U.S. PATENT DOCUMENTS

| | | | |
|---|---|---|---|
| 2,360,817 | 10/1944 | Scott | 210/531 |
| 3,002,400 | 10/1961 | Scott | 210/531 X |
| 3,240,350 | 3/1966 | Petersen | 210/531 |
| 4,048,076 | 9/1977 | Pearre et al. | 210/528 |

*Primary Examiner*—Thomas G. Wyse

*Attorney, Agent, or Firm*—Thomas S. MacDonald; Alan H. MacPherson

[57] ABSTRACT

An apparatus for driving and lifting the rake assembly in a sedimentation basin. An annular hub is mounted on the main gear member, such hub having slot means through which vertical edges of a vertically-extending rectangular torque-plate are slidably affixed. Torque is transmitted from the gear member, through the hub slot means, to the torque plate and to the rake assembly which is attached generally at the bottom of the torque plate. Side loads (horizontal unbalanced rake loads) are transmitted from the vertical edges of the torque plate through the hub slots to the main gear bearing in the drive. Means is also provided attached to the torque-plate to move the torque-plate upwardly through the slot means so as to raise and lower the rake assembly.

18 Claims, 7 Drawing Figures

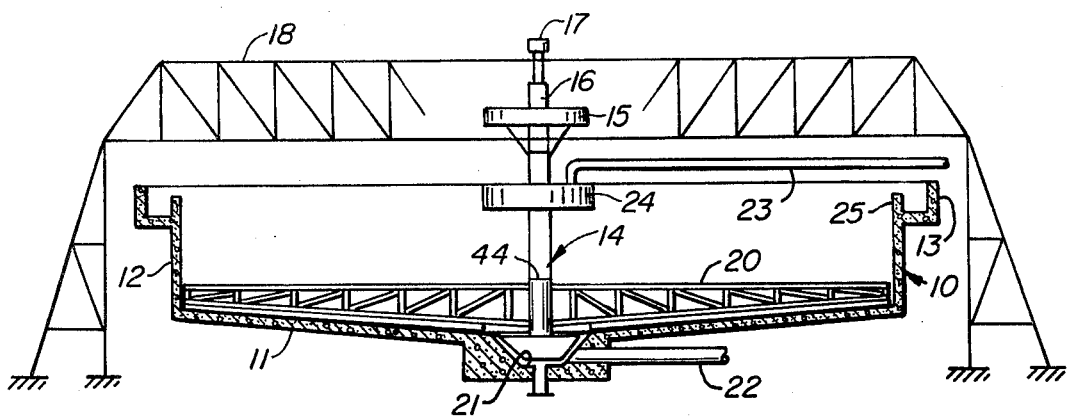
FIG._1.
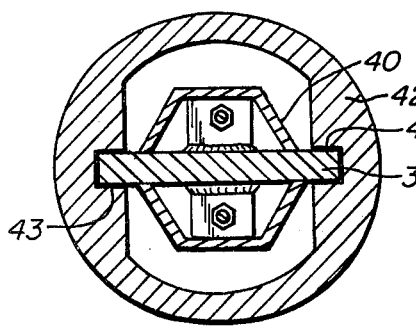
FIG._3.
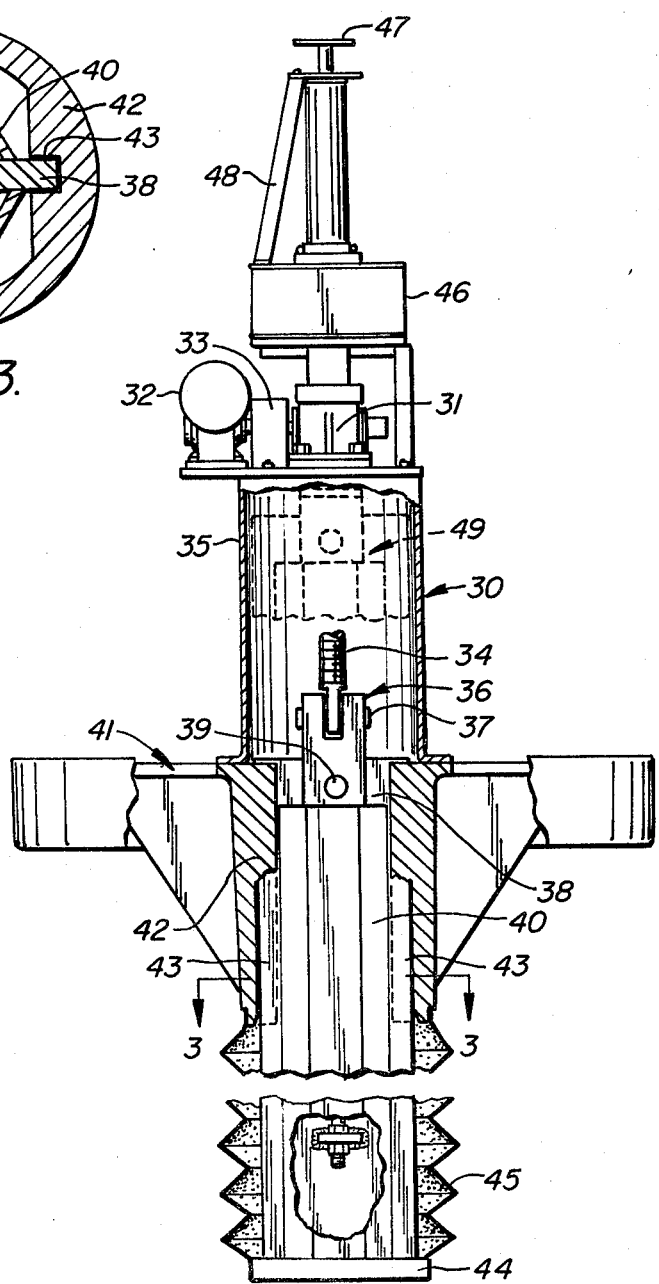
FIG._2.

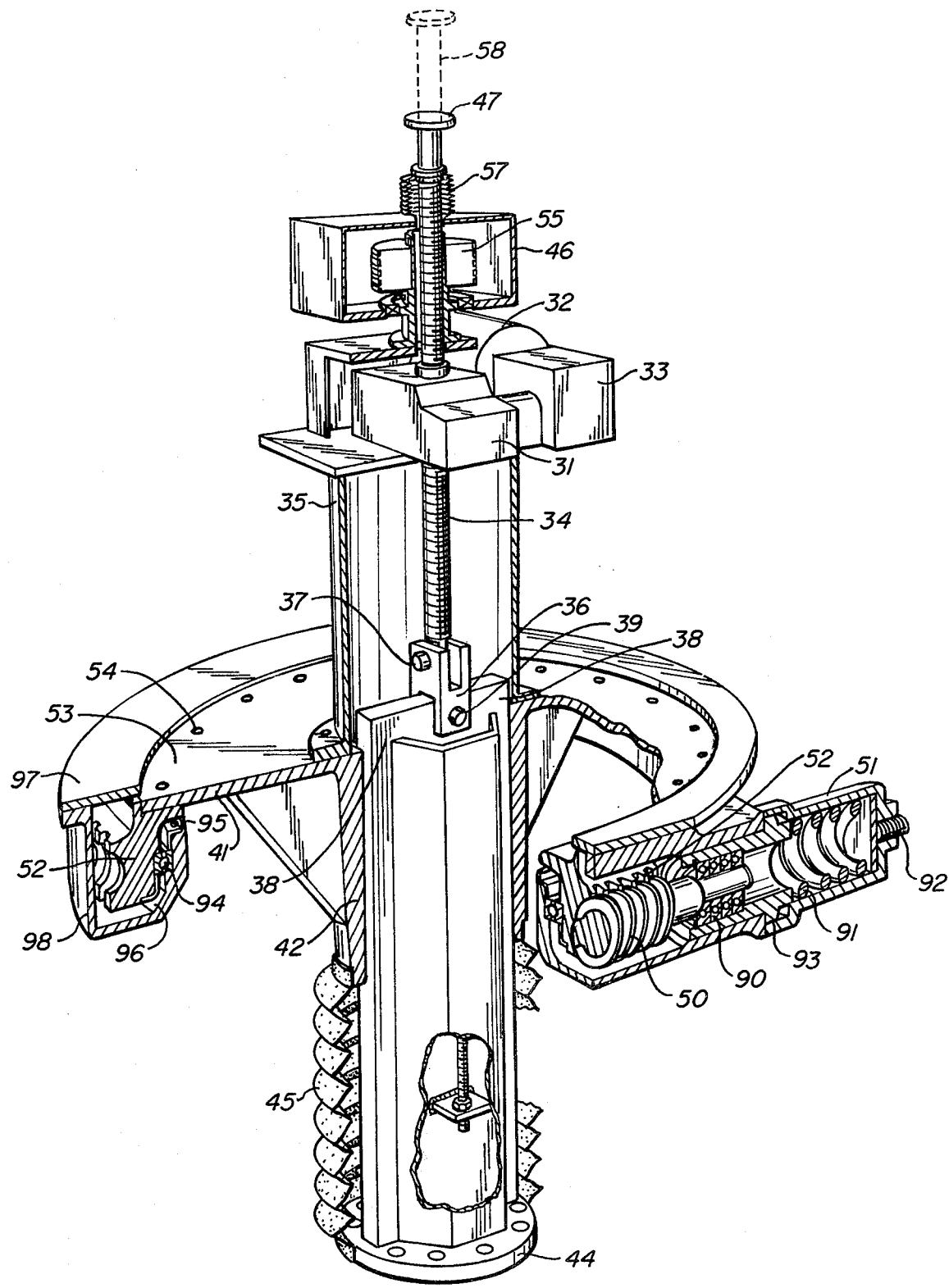
FIG._4.

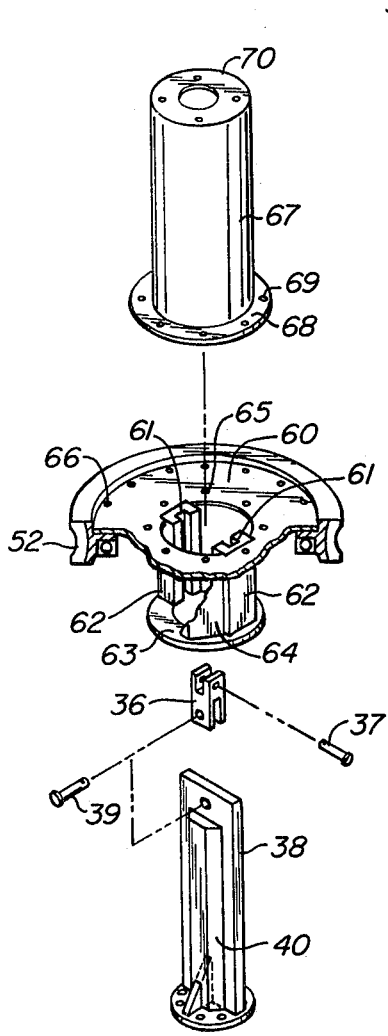
FIG._5.
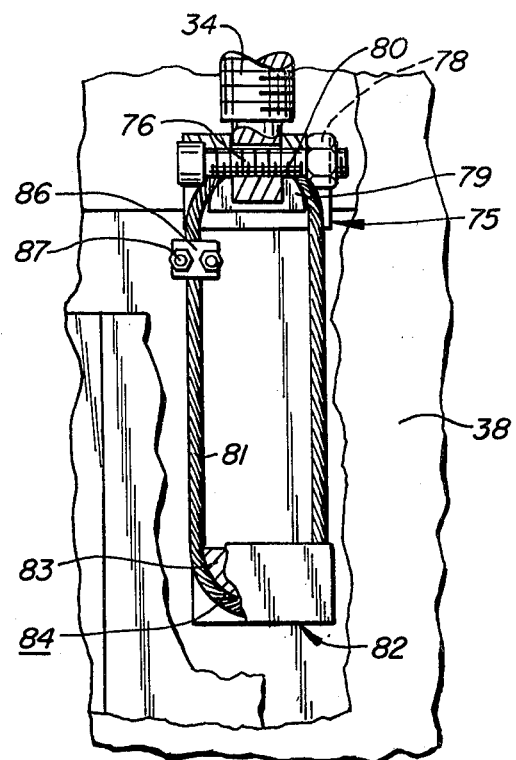
FIG._6.
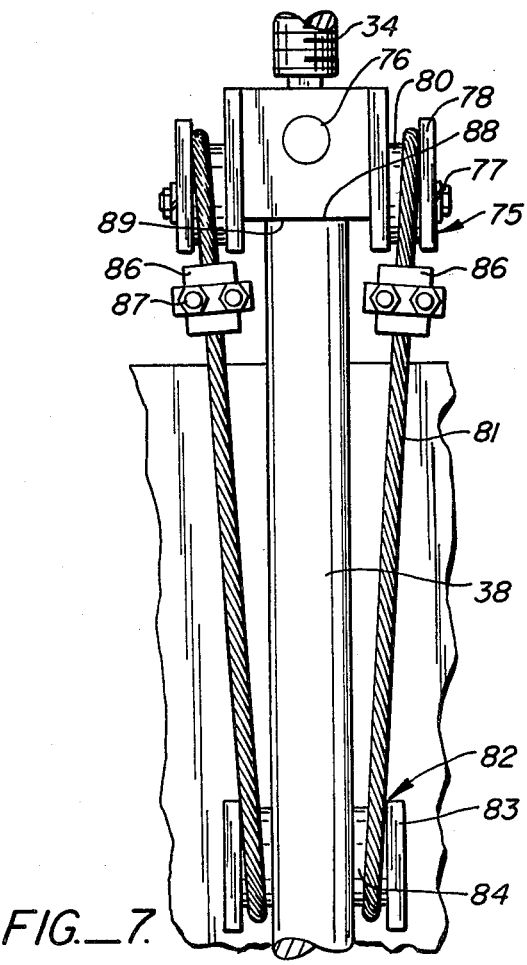
FIG._7.

RAKE DRIVE AND LIFTING DEVICE FOR SEDIMENTATION APPARATUS

BACKGROUND OF THIS INVENTION

1. Field of the Invention

The present invention relates to an improved apparatus for separating solids from a mixture of liquids and the solids of the type including a sedimentation tank into which the mixture to be treated is fed so that the solids may separate from the mixture by sedimentation and a rake structure adapted to rotate within the tank to push sedimented solids toward the center of the tank for discharge. More particularly, this invention concerns driveheads for rotating the rake structure and for lifting the rake structure.

2. Description of the Prior Art

Trade literature by the EIMCO PMD division of the Envirotech Corporation entitled "EIMCO Thickener Driveheads," illustrates several examples of prior art driveheads used in rotary sedimentation apparatus, such as thickeners. In one example, a motorized drivehead is provided for manual and/or automatic actuated raising and lowering or automatic actuated raising only. The motorized design includes a driven gear hub and a so-called torque tube secured to and extending upwardly from the hub. A drive shaft made from solid steel shaft or heavy wall steel pipe has a drive collar with integral keys connected to its upper end, and the collar is received within the torque tube. Key slots are formed in the torque tube and the keys on the collar are engaged in the slots in the torque tube. A jack screw is connected to the drive collar and shaft. The motor of the jack screw is connected to a control system that is responsive to the torque applied to the drive shaft by the rake arms so that if the rakes hit an obstruction or the driven load becomes too great as they are rotated, the jack screw will be actuated to lift the rakes while torque load is being transmitted, thereby preventing damage to the rakes or the drive.

The Bousman U.S. Pat. No. 2,727,628 illustrates a drivehead for sedimentation apparatus mounted on a column at the center of the sedimentation tank. The drivehead does not include a lift mechanism, but rather includes a load indicator and switch arrangement adapted to shut off the drive motor when the torque exerted on the motor exceeds a predetermined level. The Kepper U.S. Pat. No. 2,122,287 shows a hand-operated shaft lifting device 14–17 which acts in conjunction with a worm-driven gear wheel and a rotary driven shaft which provides driving torque to the bottom rakes.

SUMMARY OF THE INVENTION

The present invention is directed to an improved drivehead for a sedimentation apparatus that is adapted to lift the rake structure as it is rotated or in a stopped condition. In accordance with the improvement, the part of the drivehead connected to the rake structure comprises a rectangular relatively flat torque plate that may be stiffened by a suitable member or members. The torque plate is connected to a lift actuator, such as a jack screw and is slidably received in opposed slots formed in a tubular or other extension of the hub of the gear of the drivehead. Thus, torque for rotating the rake structure is transmitted through the gear and the hub directly to the torque plate connected to the rake structure. The improvement provides a relatively uncomplex, rugged drivehead with lift capable of developing high torque; providing lift capability; and providing stability against all forces. Moreover, the machining of the unit is simplified to that of the edges of the torque plate and the opposed slots in the hub, thus reducing these elements in the cost of manufacturing the drivehead. No circular shaft machining is required, the overall height is reduced, there is no bore required in the gear and the overall construction is less costly. Further the width of the torque plate shaft can be increased with a thinner wall section thus providing smaller key loads. The use of a torque plate working in key slots allows torque transmission in the normal key-to-keyway manner but also provides resistance to "overturning" loads resulting from uneven torque loads on the rake assembly.

BRIEF DESCRIPTION OF THE DRAWINGS

FIG. 1 is a diagrammatic partial sectional view illustrating an embodiment of sedimentation apparatus of the present invention.

FIG. 2 is a fragmentary view of the improved drivehead of the sedimentation apparatus, with part of the torque plate and surrounding protective cover being broken away.

FIG. 3 is an enlarged section taken as shown in FIG. 2.

FIG. 4 is a fragmentary isometric view of the drivehead further illustrating the worm screw and, in phantom outline, the connection of the drive motor to the worm screw.

FIG. 5 is an exploded view of a preferred modification of the gear hub and torque plate.

FIG. 6 is a preferred modification of lifting means in a partial cut-away sectional view showing a wire rope lift attachment means between the jack screw and the torque plate.

FIG. 7 is an enlarged side view of the wire rope lift attachment means of FIG. 6.

DETAILED DESCRIPTION OF THE EMBODIMENTS

The apparatus of FIG. 1 involves a sedimentation device which may function in its normal manner as a liquids-solids separator either as a thickener where thickened solids are the desired product, as for example in minerals processing applications, or as a clarifier where clarified overflow is desired as in the waste water treatment field. The device includes a conventional cylindrical tank 10 having a flat inwardly inclined floor 11, a vertical side wall 12, a peripheral overflow trough or launder 13, a center shaft 14 for a drive unit 15 for a rake lifting system 16, a lift power collector 17, a mechanism support bridge 18, and a rake assembly 20 typically attached by flange connection 44 to shaft 14.

In operation the device is filled through feed pipe line 23 with a liquid containing suspended solids particles into a feed well 24 and thence to tank 10 which is filled to a level equal to the height of a peripheral circular weir 25. The unit acts as a settling basin with solids falling to the tank bottom floor where they are raked by radially-extending conventional rake blades into a central sludge pocket 21 from where they are pumped or otherwise removed through sludge removal pipe 22. Clarified liquid overflows weir 25 into launder 13 and is removed by suitable piping (not shown). The rake assembly 20 is driven by a drive unit 15 through the improved rake driving system with lifting system 16 hereafter described. The lifting system 16 is employed with the rake driving system to lift the rake assembly 20 when it is overloaded due to accumulated solids or it encounters an obstruction.

FIG. 2 shows the details of one form of torque drive and lift system. It includes a lift device 30 comprised of a worm-driven lift actuator 31 driven by a motor 32 through a gear reducer 33 and a vertical jack-screw lift shaft 34 meshing with the actuator worm. Lift shaft 34 is surrounded by a fixed lift tube 35 which protects the shaft 34 and other internal structures from spillage and weather. Shaft 34 is attached by a universal clevis 36 to accommodate any misalignments of the jack screw and torque plate. Shaft 34 is pinned by shaft clevis pin 37. Depending from clevis 36 is a vertically-extending flat rectangular torque plate 38 which is attached to the clevis by plate clevis pin 39. A suitable plate stiffener 40 typically in hexagon-cross section is welded to the plate and extends over a desired vertical length of plate 38.

A gear hub 41 fixedly connected to the main drive gear of the sedimentation device, extends horizontally and includes a depending or vertical extension 42 containing a pair of extension slots 43 normally 180° opposed to each other. Vertical sides portions and edges of the torque plate 38 are slidingly affixed through slots 43. Torque is transmitted from the main gear drive, through the hub and its slots to the torque plate. Side loads (horizontal unbalanced rake loads) are transmitted from the vertical edges of the torque plate through the hub slots to the main gear bearing in the device. A bolt flange 44 is welded or otherwise affixed adjacent to the bottom of plate 38. The rake assembly 20 is bolted to such flange and thus rotated by the rotation of torque plate 38. A flexible protective boot 45 of rubber or other material is provided to protect the lift mechanism working components from the liquids-solids in the sedimentation device. Torque plate 38 may in normal size sedimentation devices be of a thickness of 1" to 3". It extends across the full width of the gear hub into the keyways or slot means 43. The keyways 43 are established a vertical distance sufficiently long to provide stability and guidance to the plate sides and edges.

The lift actuator 31 may itself be actuated by a torque measuring device (not shown) which feeds an electrical signal through a slip ring power supply assembly contained in case 46 on the upper end of lift shaft 34. If desired a visual position indicator 47 may be utilized to denote the position of jack screw 34, the attached torque plate 38 and the attached rake assembly 20. A strut support 48 for the indicator is normally employed. Numeral 49 denotes the "UP" position of the mechanism in dotted lines. While a mechanical drive is shown for the lift screw 34 the screw may also be driven by hydraulic or pneumatic air-cylinder means.

FIG. 3 shows a cross-sectional view of the hub extension 42, the extension slots or keyways 43 and plate stiffener 40. Torque is transmitted to torque plate 38 through the interaction of the side walls of the slots 43 contained in the hub extension 42 with the vertical peripheral sides and edges of the plate.

FIG. 4 shows additional detail of the drive and lift mechanism. In this instance a worm and gear drive is illustrated. A worm drive 50 contained in a worm-drive case 51 transmits motion to a circular drive gear 52. Worm drive 50 includes a worm thrust bearing 90, a spring 91 and adjusting screw 92 to vary spring tension and a stop member 93 restricting motion of the worm laterally. The annular horizontal gear hub extension 42 has a bolt rim 53 which is bolted by bolts 54 to a inner peripheral top of drive gear 52. Gear 52 which may be termed the worm wheel is contained in a housing 98 and bears against bearing 94 retained in housing 98 by upper and lower bearing retainers 95 and 96. A protective cover 97 is provided over the housing 98. Torque is transmitted through the hub with its slot means to torque plate 38 and to bolt flange 44 where the rake assembly 20 is fixedly attached. Lift shaft 34 is shown extending upwardly from lift clevis 36 to position indicator 47. It is contemplated that other position indicator such as a control board read-out, or light or sonic signal may be utilized to indicate rake position or the existance of "lifting" mode actuation. Suitable limit switches (not shown) may be provided to control travel limits of the lift screw. A slip ring assembly 55 is shown within case 46. A suitable flexible seal 57 between the case and indicator 47 protects against entry of foreign substances.

FIG. 5 shows an exploded view of the gear drive hub, torque plate and lift shaft. It shows the gear drive hub made from welded components. A flat annular hub disc 60 bolted to drive gear 52, the hub disc having 180° opposed key slots 61 in depending, machined key blocks 62 fixedly attached as by welding to the drive hub 60 and held in fixed orientation by stabilizing ring 63 and tubular member 64 (shown partial for clarity). Key blocks 62 contain inner vertical slots 61 through which the vertical side edges and end edges of torque plate 38 are slidingly engaged. Bolt apertures 65 and 66 are provided in the hub disc for attachment of a protective lift tube 67 and drive gear 52, respectively. The lift tube contains a bolt flange 68 and bolt apertures 69 corresponding to apertures 65. The lift actuator mechanism may be bolted to the lift tube top surface 70.

FIG. 6 and FIG. 7 show a preferred wire rope lift means 75 for attaching the lift screw or shaft 34 to the torque plate 38. Means 75 comprises a clamp assembly including a lift shaft holding pin or bolt 76 and a clamp holding bolt 77 below and at right angles to bolt 76. Bolt 77 holds (as best seen in FIG. 7) cover cap 78 to ropeway spacers 79 which have an upper half-moon (semicircle) curved rope-bearing surface 80. Cover cap 78 has an area dimension greater than spacers 79 so that a wire rope 81 is confined on its bearing surface in a groove between the outside vertical surface of clamp assembly 75 and the inner vertical surface of end cap 78. Wire rope 81 is typically a ½" diameter flexible wire cable. Similarly a plate rope lift 82 is provided welded or bolted to the torque plate 38 at a point vertically displaced downwardly from the plate top. A half-moon (semi-circle) curved rope-bearing surface is provided on the bottom part of the lift and the wire rope held in a groove formed by the rectangular end cap 83, again of larger area dimension than the rope bearing surface. The wire rope is made to a closed loop by using clamping bolts 87 or by other means of joining two ends of a wire rope commonly used. Wire ropes 81 are each on opposite sides of torque plate 38. Rope lift 75 is wider than the plate rope lift 82 so that the wire ropes 81 extend at an acute angle with each other as they depend from their bearing on the jack screw clamp to their bearing on the torque plate lift. This provides for a smoother, more positive "pull" of the torque plate through the slot means in the gear hub as shown in the previous Figs.

While normally the weight of the torque plate 38 will allow its return downwardly along with the attached rake assembly 20, positive movement of jack screw 34 downwardly will butt a flat bottom surface 88 of rope lift means 75 against the top horizontal surface 89 of torque plate 38 forcing the torque plate and the attached rake assembly into its desired operating position on a vertical scale. The cable or rope which acts as a tension device in the lift mode becomes loose when the screw mechanism is being used as a rake push down device. Suitable lubrication means (not shown) is normally provided to lubricate the sliding movement of the torque plate through the hub slots.

I claim:

1. An improved sedimentation apparatus generally including a sedimentation basin having a central upright axis, a rake assembly adapted to be rotated within the basin about said axis, and a drivehead connected to said rake assembly for rotating the rake assembly, wherein the improvement comprises said drivehead including a drive motor, a drive gear member, and an annular horizontally mounted drive hub in fixed axial relationship with the central axis of the basin, a vertically-extending torque plate having vertical edges slidably affixed within a slot means in said hub, said torque-plate having attachment means for affixing said rake assembly thereto and means attached to said torque plate for raising the torque plate through said slot means, whereby said torque-plate can both rotate and raise said rake assembly while subjected to operating loads.

2. The apparatus of claim 1 in which said torque plate is rectangular and of a lateral thickness permitting its vertical outside edges to slidingly engage said hub slot means.

3. The invention of claim 1 in which said means for raising said torque plate includes a universal clevis pinned to a jack-screw and pinned to the top of said torque plate.

4. The invention of claim 1 in which said slot means vertically extend downwardly from the horizontal hub and are coextensive with a sufficient vertical height of said torque plate, whereby torque can be transmitted to said rake assembly at various vertical levels within said basin and side loads on the torque plate are transmitted to the drive gear and a support bearing.

5. The invention of claim 1 further including lubrication means for said slot means and said torque plate sliding therethrough.

6. The invention of claim 1 including stiffener means extending lengthwise of said torque plate inboard of the plate vertical edges slidingly engaged with said slot means.

7. The invention of claim 1 wherein said horizontal hub is a separate member bolted to said gear member.

8. The invention of claim 7 in which said horizontal hub includes an integral depending extension containing said slot means.

9. The invention of claim 7 in which said horizontal hub includes an annular disc bolted to said gear member, opposed slots in the inner periphery of the disc, depending keys fixed in said slots, a stabilizing ring holding said keys in fixed orientation, said slot means formed in the inner facing peripheries of each of said keys.

10. The invention of claim 1 in which said means for raising the torque plate includes a pair of wire ropes extending from an upper jack screw to an affixation to said torque plate.

11. The invention of claim 1 in which said means for raising the torque plate includes a clamp affix to the bottom end of a jack screw, a rope-bearing surface in said clamp, a rope-bearing surface fixedly attached to said torque plate at a vertical position below the top of said plate and below said clamp and a flexible rope extending between said rope-bearing surfaces to raise said plate with respect to said slot means.

12. The invention of claim 11 further including a pair of rope-bearing surfaces in said clamp and a pair of rope-bearing sufaces on opposite sides of said torque plate and a pair of rope loops extending between respective rope-bearing surfaces on said opposite sides of said torque plate.

13. The invention of claim 12 including cap means on and said rope-bearing surfaces to confine said rope loops in a formed groove.

14. The invention of claim 13 in which at least two of said cap means are removable so as to insert or remove a rope loop.

15. A sedimentation rake drive means comprising a rotatable gear member, a horizontal annular gear hub connected to said gear member and having vertically elongated slot means on the inner peripheral surface thereof, a vertically-extending torque plate journalled in said slot means and adapted to transmit torque from said hub to a rake assembly and means connected to said torque plate to slidingly move said torque plate vertically through said slot means to raise said rake assembly.

16. The invention of claim 15 in which said hub is a flat disc boted to said gear member, said disc having an downwardly extending extension containing said slot means, said slot means comprising a pair of 180° disposed slots, said torque plate being of rectangular configuration with its outside vertical edge portions in sliding juxtaposition in said pair of slots.

17. The invention of claim 15 wherein said means to move said torque plate vertically includes a jack screw attached to said torque plate.

18. The invention of claim 17 wherein said jack screw is attached to a jack screw clamp, a rope lift is attached to said torque plate and a lift rope extends between said clamp and said rope lift.

* * * * *